Figure 2:
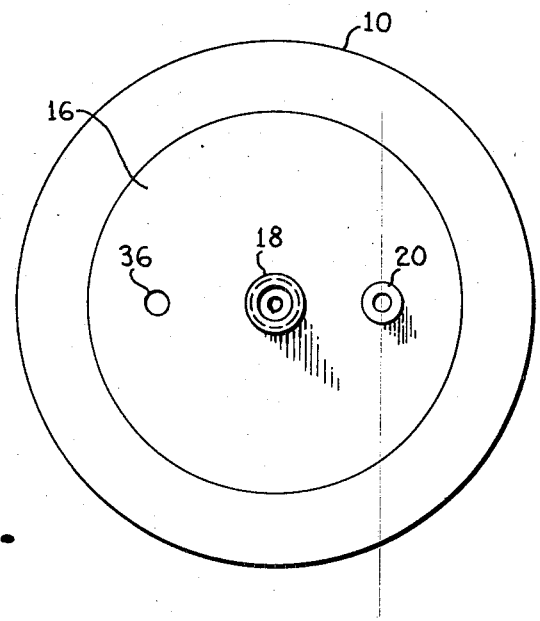

United States Patent
Pedersen

[15] 3,645,293
[45] Feb. 29, 1972

[54] ELECTRIC TO FLUIDIC TRANSDUCER
[72] Inventor: Niels E. Pedersen, Milwaukee, Wis.
[73] Assignee: Johnson Service Company
[22] Filed: Apr. 2, 1970
[21] Appl. No.: 25,154

[52] U.S. Cl. .............................................137/608, 137/81.5
[51] Int. Cl. ..........................................................F15c 3/04
[58] Field of Search .........................................137/81.5, 608

[56] References Cited

UNITED STATES PATENTS

| | | | |
|---|---|---|---|
| 3,171,915 | 3/1965 | Johnson | 137/81.5 X |
| 3,426,800 | 2/1969 | Bauer | 137/81.5 X |
| 3,438,384 | 4/1969 | Hurvitz | 137/81.5 |
| 3,485,254 | 12/1969 | Ernst | 137/81.5 |
| 3,494,369 | 2/1970 | Inoue | 137/81.5 X |
| 3,500,851 | 3/1970 | Skinner | 137/81.5 |
| 3,500,853 | 3/1970 | Freeman | 137/81.5 X |
| 3,519,009 | 7/1970 | Rubin | 137/81.5 |

*Primary Examiner*—Samuel Scott
*Attorney*—A. J. DeAngelis

[57] ABSTRACT

The output of a fluidic amplifier is controlled by movement of a diaphragm with respect to the amplifier control nozzle. A permanent magnet magnetically coacts with a magnetizable portion of the diaphragm to provide a predetermined flux density to such portion. An electromagnetic coil is also positioned for magnetic interaction with the magnetizable portion of the diaphragm. When alternating current is applied to the electromagnetic coil of the transducer, the generated flux field interacts with that of the permanent magnet to change the flux field effective on the magnetizable portion. This causes the diaphragm to assume a new position with respect to the control nozzle for different current values applied to the coil, providing an output signal of the fluidic amplifier in accordance with the level of the energizing alternating current to the electromagnetic coil.

6 Claims, 2 Drawing Figures

PATENTED FEB 29 1972

3,645,293

NIELS E. PEDERSEN INVENTOR.

BY J.J. De Angelis
ATTORNEY.

ELECTRIC TO FLUIDIC TRANSDUCER

The invention relates to electric to fluidic transducers, especially those energized from an alternating current source.

Electric to fluidic transducers convert changes in electrical energy into corresponding fluidic signals. Such transducers usually include an electromagnetic coil for moving a diaphragm to affect the flow of fluid in the transducer, providing a fluidic output signal. The coil is normally energized by direct current or "pulsating" unidirectional current.

In certain applications of fluidic controls, it is desirable to provide an electric to fluidic transducer which is responsive to different magnitudes of an alternating current signal input to an electromagnet. It is also desirable to provide such transducers which are reliable, simple to construct, of small size, inexpensive and easy to apply and maintain.

It is, therefore, an object of the invention to provide an electric to fluidic transducer adapted for energization from an alternating current source, which transducer is readily adaptable to various applications and yet is of simple construction, of small size, reliable in operation and economical to manufacture and maintain.

In carrying out the invention, according to a preferred embodiment, a fluidic amplifier is provided with a supply nozzle, feeding pressurized air into an output chamber to provide a signal at an output conduit from the chamber. A control nozzle, coaxially aligned with the supply nozzle, exhausts to atmospheric pressure. A diaphragm is positioned for movement towards and away from the control nozzle, the relative position of the diaphragm with respect to the control nozzle influencing the flow of pressurized air through the control nozzle to atmosphere. This, in turn, increases or decreases the pressure in the output chamber and, thus, the level of the output signal. Movement of the diaphragm closer to the control nozzle causes the output signal to increase, while the inverse is true.

The diaphragm is moved with respect to the control nozzle in response to changes of an input alternating electrical signal applied to an electromagnet arranged for magnetic interaction with a magnetizable member attached to the diaphragm. A permanent magnet is also positioned for magnetic coaction with the magnetizable member of the diaphragm. The permanent magnet causes a certain flux density in the member. The fluxes generated by the permanent magnet and the electromagnet combine to position the diaphragm into an initial position with respect to the control nozzle to supply a given output signal. Changes in the amplitude of the current applied to the electromagnet varies the position of the diaphragm with respect to the control nozzle, causing an output signal variation corresponding to the root mean square (RMS) of the alternating electrical signal input. When the permanent magnet flux approximately saturates the member, increases in the field generated by the applied current causes the member and diaphragm to move towards the nozzle, increasing the output fluidic signal. When the permanent magnet flux in the magnetizable member is selected at a relatively low bias level, the effective flux due to increasing RMS of alternately applied current, moves the diaphragm away from the nozzle decreasing the fluidic output signal.

Features and advantages of the invention may be seen from the above, from the following description of the preferred embodiment when considered in conjunction with the drawing and from the appended claims.

Figure 1:
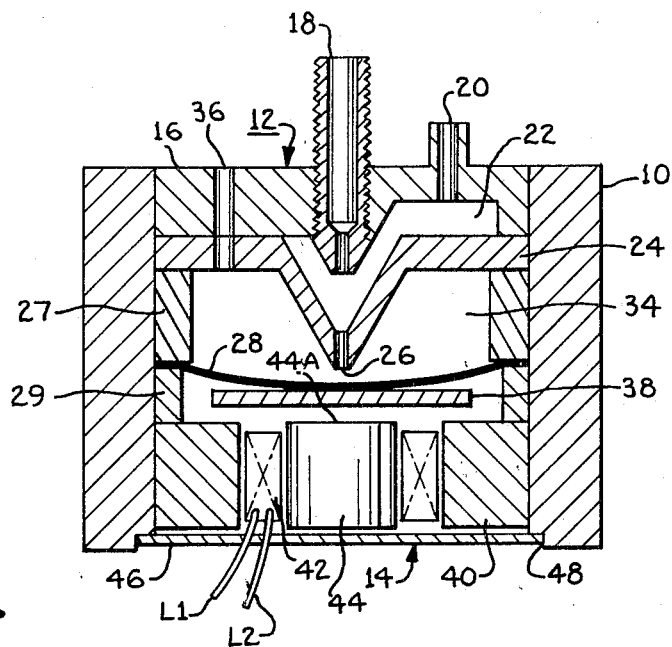

In the drawing:

FIG. 1 is a simplified, diagrammatic cross-sectional view, in front elevation, of an electric to fluidic signal transducer, embodying the invention, and FIG. 2 is a top view of the transducer of FIG. 1.

Referring to the drawing, the electric-fluidic transducer comprises a cylindrical housing 10, containing a fluidic amplifier, generally designated 12, in its upper portion (FIG. 1) and a magnetic actuator, generally designated 14, inside its bottom portion. Fluidic amplifier 14 may be formed of any convenient material (such as plastic) and shape, being shown of generally circular configuration for fitting inside housing 10. This amplifier comprises a first member 16, having a supply nozzle 18 axially formed therein and an output conduit 20 spaced therefrom, both opening into an output chamber 22 formed between member 16 and a cooperating member 24 sealed thereto in any convenient manner. Member 24 has formed therein a control nozzle 26 in alignment with the supply nozzle 18 for receiving air under pressure from the supply nozzle. A diaphragm 28 is supported between two spacers 27,29 of ringlike configuration, the diaphragm forming an exhaust chamber 34 into which control nozzle 26 feeds air. Exhaust chamber 34 is vented to atmospheric pressure by means of a vent channel 36 cut through fluidic amplifier members 16 and 24.

Diaphragm 28 is preferably of a spring-type material which may be flexed for movement towards and away from control nozzle 26 to control the airflow through such nozzle to exhaust channel 36. Fastened onto diaphragm 28, in any convenient manner, is a member of magnetizable material 38.

The magnetic actuator 14 portion of the transducer includes a permanent magnet 40 of ring configuration, encircling an electromagnet, comprising a coil 42 encircling a core 44. The ring magnet 40, coil 42 and magnetic core 44 are positioned in housing 10 by spacer 29 to provide a predetermined airgap between magnetizable member 38 of diaphragm 28 and the pole face 44A of core 44. Coil 42 may be energized from any convenient alternating current source (not shown) by means of coil input wires L1 and L2 to provide an electrical signal input to the transducer.

A retaining plate 46 is fastened, as by gluing, in a recess 48 formed at the bottom (FIG. 1) of housing 10 to retain the magnetic actuator assembly in position. Plate 46 is of magnetizable material and provides a magnetic circuit for flux flow between ring magnet 40, coil 42, core 44 and magnetizable member 38.

In operation, the flux from ring magnet 40 magnetically coacts with magnetizable member 38 carried by diaphragm 28 to bias the diaphragm in a certain initial position with respect to control nozzle 26 of fluidic amplifier 12. Assume that permanent magnet 40 is magnetized to provide a flux level such that, when the transducer is assembled as described, magnetizable member 38 is substantially saturated and is pulled by such magnetic attraction towards the magnet, flexing springlike diaphragm 28 away from nozzle 26. Next assume that a predetermined magnitude of alternating current is next applied to coil 42 over wires L1,L2. The flux generated by coil 42 also tends to coact magnetically with member 38. Also assume a given polarity of ring magnet 40, say, with its upper portion (FIG. 1) magnetized for North Polarity and its bottom portion polarized for South polarity and coil 42 mounted on core 44 such that during positive half-cycles of the applied current its flux field is additive to that of the ring magnet, while during negative half-cycle it is subtractive to the ring magnet flux. Under such conditions, during positive half-cycle of the applied current, the additional magnetic flux generated by coil 42 in flowing through core 44 and plate 46 does not attract magnetizable member 38 carried by the diaphragm, since member 38 is already saturated with flux from ring magnet 40. Thus, during half-cycles of the coil current which generate flux additive to that of biasing ring magnet 40, the coil flux does not affect magnetizable member 40 or cause movement of diaphragm 28. However, during alternate half-cycles of current applied to coil 42 (negative half-cycles for the assumed polarity of magnet 40), the flux generated by coil 42 is subtractive to that of permanent magnet 40 and, therefore, decreases the flux density in magnetizable member 38 carried by diaphragm 28. Such decreased magnetic force acting on member 38 allows the flexed springlike diapragm 28 to move toward control nozzle 26. Thus, for a given magnitude of applied alternating current the diaphragm assumes a "mean" position with respect to control nozzle 26, allowing a certain airflow through such nozzle into exhaust chamber 34 to create a predetermined pressure in output chamber 22.

This, in turn, provides a certain output fluidic signal level at output conduit 20.

Next assume that the applied alternating current to coil 42 increases a certain amount in magnitude. Under such conditions, the net flux tending to pull diaphragm 28 away from nozzle 26 decreases and causes the diaphragm to assume a new "mean" position closer to control nozzle 26. This allows decreased airflow into exhaust chamber 34 and out exhaust 36 to atmosphere, in turn, increasing the pressure in output chamber 22 and the fluidic signal flowing through output conduit 20.

A reduction in the magnitude of current applied to coil 42 acts inversely allowing diaphragm 28 to move away from control nozzle 26 up to its initial bias position. As diaphragm 28 moves further from control nozzle 26, it increases the flow of air through the control nozzle to exhaust chamber 34. This causes the air flowing from supply nozzle 18 to decrease the pressure in output chamber 22 and, in turn, the magnitude of the fluidic signal flowing out of output conduit 20.

It may be noted that the described construction provides a direct acting transducer wherein an increased AC signal input produces an increase in fluidic signal output and vice versa. If desired, the transducer can be arranged for indirect operation to provide a decreased fluidic signal output in response to an increase in magnitude of the alternating current applied to coil 42, and (vice versa), rather than the direct acting arrangement just described. This is accomplished simply by magnetizing permanent magnet 40 to a lower level, such that it magnetically biases magnetizable member 38 at a level somewhat below the saturation point of the member, say, at half saturation. Under such conditions, the flux generated by coil 42, when in phase with the flux of ring magnet 40, adds to the flux acting on member 38 to pull diaphragm 28 (tending to close the airgap) against its spring bias away from nozzle 26. Out of phase flux from coil 42 tends to subtract from the permanent flux, decreasing the effective permanent magnet flux pull on member 38, allowing diaphragm 28 to move towards nozzle 26. With AC current applied to coil 42, the diaphragm tends to maintain a distance from nozzle 26 in accordance with the root mean square (RMS) of the current through the coil. This is so, since the magnetomotive force acting on the member 38 is inversely proportional to the square of the distance (airgap) and directly proportional to the flux density acting on the member. Therefore, the effective pulling force acting on member 38 is greater when the coil flux is in phase with the permanent magnet flux than the effective force when the coil flux is out of phase. The result is that an increase in magnitude of AC coil current and, in turn, coil flux results in a net greater pull on diaphragm 28 moving it away from control nozzle 26, thereby decreasing the level of the output fluidic signal of the transducer. Conversely, a decrease in AC input signal level places less pull on diaphragm 28, allowing it to move towards nozzle 26, thereby increasing the level of the output fluidic signal of the transducer.

Thus, the output fluidic signal varies in response to variations in magnitude of the electrical alternating current signal applied to electromagnetic coil 42, the permanent ring magnet 40 acting as biasing means for providing a fluidic signal which varies in response to the alternating current applied to coil 42, either directly or indirectly, as may be desired.

It may be noted that without a biasing permanent magnet, the flux due to AC current would not change the position of diaphragm 28 for different current values, since the changing flux provides balanced forces acting on member 38.

The above-described construction provides an electric to fluidic transducer of relatively small size, which can be simply constructed and assembled, is inexpensive and easy to maintain and apply.

As changes can be made in the above-described construction and many apparently different embodiments of this invention can be made without departing from the scope thereof, it is intended that all matter contained in the above description or shown on the accompanying drawing be interpreted as illustrative only and not in a limiting sense.

What is claimed is:

1. An electric to fluidic transducer comprising, a fluidic amplifier having a control nozzle, an output nozzle and a supply nozzle,
    said amplifier providing an output signal at said output nozzle under conditions where fluid under pressure is supplied to its said supply nozzle,
    said amplifier output signal being responsive to the flow of fluid through said control nozzle,
    a member mounted for movement with respect to said control nozzle for controlling the fluid emitted therefrom,
    said member including a magnetizable portion,
    magnet means magnetically biasing said magnetizable portion to a predetermined flux saturation level,
    electromagnetic means energizable by alternating current for generating a magnetic flux,
    said electromagnetic means being arranged for magnetic interaction with said magnet means flux acting on said magnetizable member for moving said member with respect to said control nozzle in accordance with the magnitude of the energizing alternating current.

2. A transducer as set forth in claim 1 wherein said control member is of springlike material.

3. A transducer as set forth in claim 2 wherein said magnet means is selected of a magnetized level sufficient for substantially magnetically saturating said magnetizable portion for causing said output fluidic signal to be directly responsive to the magnitude of said alternating current.

4. A transducer as set forth in claim 3 wherein said magnet means is a permanent magnet.

5. A transducer as set forth in claim 2 wherein said magnet means is selected of a magnetized level sufficient for magnetizing said magnetizable portion at a level substantially below its magnetic saturated level for causing said output fluidic signal to be indirectly responsive to the magnitude of said alternating current.

6. A transducer as set forth in claim 5 wherein said magnet means is a permanent magnet.

* * * * *